UNITED STATES PATENT OFFICE.

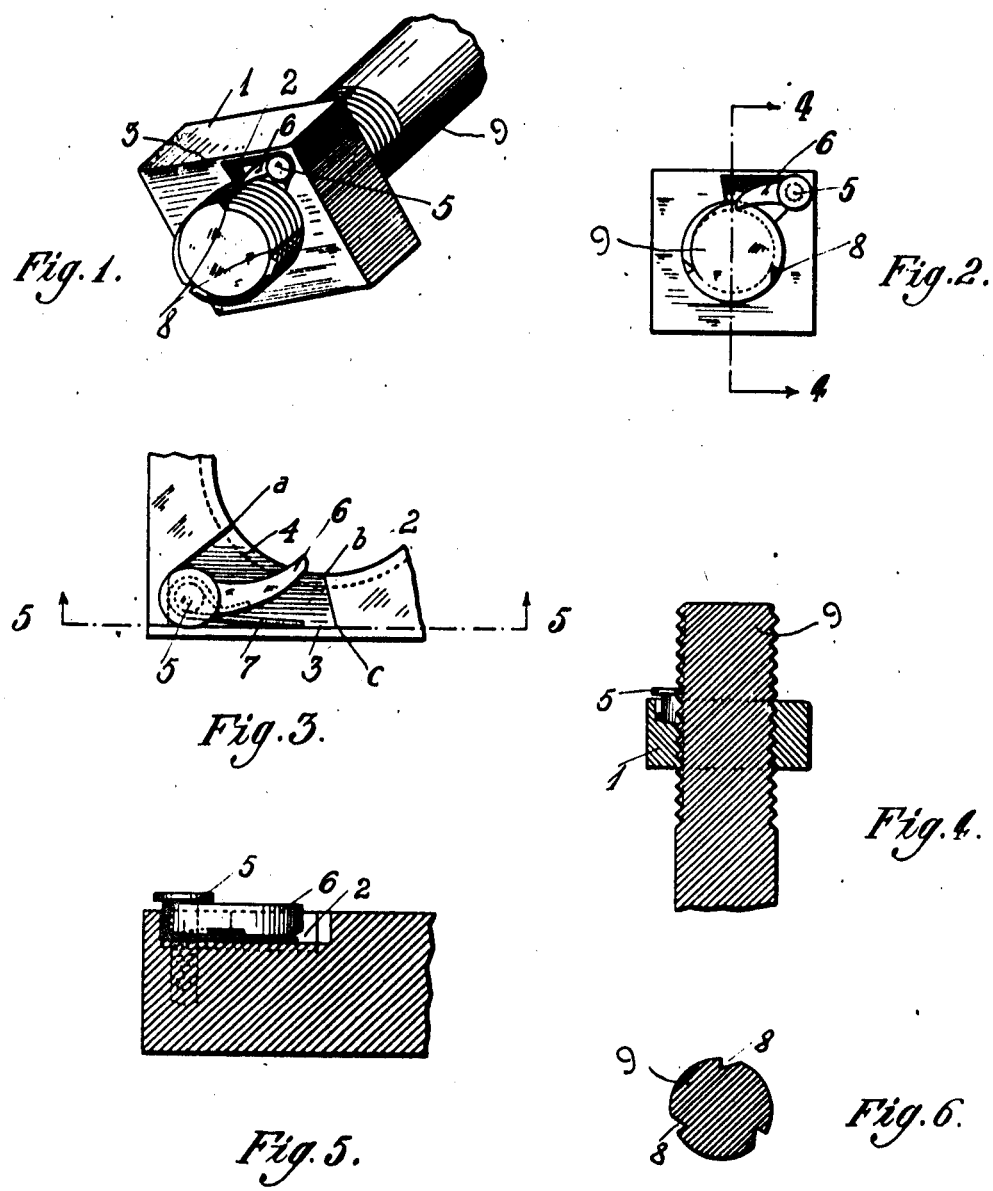

JOHN J. SNYDER, OF JERSEY CITY, NEW JERSEY.

SELF-LOCKING NUT.

1,141,280.

Specification of Letters Patent.

Patented June 1, 1915.

Application filed August 31, 1914. Serial No. 859,383.

*To all whom it may concern:*

Be it known that I, JOHN J. SNYDER, a citizen of the United States, residing at Jersey City, in the county of Hudson and State of New Jersey, have invented new and useful Improvements in Self-Locking Nuts, of which the following is a specification.

My invention relates to self-locking nuts and has as its object to provide a device of this character which automatically locks on any threaded bolt it is adapted to be used for, so that when once set it cannot slip back or loosen its grip on the bolt, unless so desired.

A further object of my invention is to provide a device of the above said character which can be set in a manner that it moves freely on and off the threaded bolt, when so desired.

A final object of my invention is to provide a device of the said character that can be manufactured at a very low cost, is effective and unfailing in its purpose and does entirely away with jam nuts and the like.

I attain my objects by providing a construction as hereinafter shown and described.

In the accompanying drawing: Figure 1 is a perspective view of a nut constructed according to my invention, locked on a proper threaded bolt in conjunction with which it has to be used. Fig. 2 is an end elevation of the same. Fig. 3 is a detail elevational view of part of the construction. Fig. 4 is a section taken on the line 4—4 of Fig. 2. Fig. 5 is a partly sectional and partly elevational view the section being taken on the line 5—5 of Fig. 3. Fig. 6 is a sectional view of the threaded bolt.

Referring more particularly to the drawing, 1 designates a nut provided at the outer surface of the same, in respect to the threaded bolt it engages, with a depression 2 substantially of the shape shown in the drawing, and slightly slanting from the outer edge 3 of the nut toward its inner edge 4, forming an incline at the bottom of said depression 2 which rises gradually from the inner part of the nut to its outer periphery, in a slight degree.

In one or more corners of the nut 1, within a depression such as above described, of which I can provide one or more on each nut, a pivot stud such as 5 is fixedly mounted or else a set screw fitted into a female thread provided in the nut for that purpose, and pivoted on the stud 5 is a dog 6 moving freely from the point *a* to *b* of the depression 2, whereas after passing the point *b* and pushed farther back toward the point *c* of the same, it gets jammed by the incline of the bottom of the depression 2 sufficiently to stick there until released by a pressure with a finger or some instrument, pushing it away from the point *c* toward point *b*.

The dog 6 has a groove around its bushing, about centrally of its thickness and a hole pierced through the dog 6 in front of the pivot stud 5. A piece of flexible wire 7 is passed through the said hole and around the groove, leaning with one end against the back of the dog 6 and with the other against the wall of the depression 2 and thus forming a spring which normally tends to push the dog 6 forward in the direction of the point *a* and certainly past the point *b*.

I provide longitudinal grooves such as 8, three or more of them as may be required, in the thread of the bolt 9 to be used in conjunction with my nut and when the nut 1 is screwed on upon the bolt 9, the dog 6, in consequence of the action of the spring 7, is forced to engage in succession each of the grooves 8 and thereby the nut cannot slip back from the position it has been fixed at, unless the dog is pried out by the finger or some tool from its engagement with the groove. If it is desired to remove the nut, the dog 6 can be pushed back toward the point *c* of the depression 2, where it will be jammed and the nut will come off freely.

In order to get as many points of attack for the dog 6 and thereby to provide a possibly large number of locking points, so that the nut can be adjusted practically at any position desired, I may provide two or more dogs on each nut and as large a number of grooves on the bolt as is consistent with its efficiency and with the strain placed on it.

Having thus described the preferred form of my invention, it will be understood that I do not want to be limited to its mechanical details and I contemplate such changes in the construction of the nut which will enhance its efficiency without departing from the principles of my invention as defined by the appended claim.

Having thus fully shown and described my invention, what I claim is:

The combination with a threaded bolt having a plurality of longitudinal grooves in its threaded part, of a nut having in one corner of its outer face a recess, a pivot stud rigidly mounted in said recess, a pawl pivotally mounted on said stud, a spring passed around the hub of said pawl having one end bearing against the outer wall of said recess, the other end in engagement with the outer edge of said pawl, and tending to keep the latter in a position projecting into the bore of the nut, so as to engage said longitudinal grooves of the bolt and automatically prevent the nut from coming off, the bottom of said recess slanting downwardly from the outer wall thereof toward the bore of the nut and adapted to keep said pawl jammed out of engagement with said bolt, thereby allowing said nut to be removed from said bolt, substantially as set forth.

JOHN J. SNYDER.

Witnesses:
ALEXANDER DENES,
ALADAR HAMBURGER.